No. 675,015. Patented May 28, 1901.
C. Z. F. ROTT & J. H. CROSKEY.
APPARATUS FOR OVERCOMING CORDS IN GLASS.
(Application filed July 18, 1900.)
(No Model.)
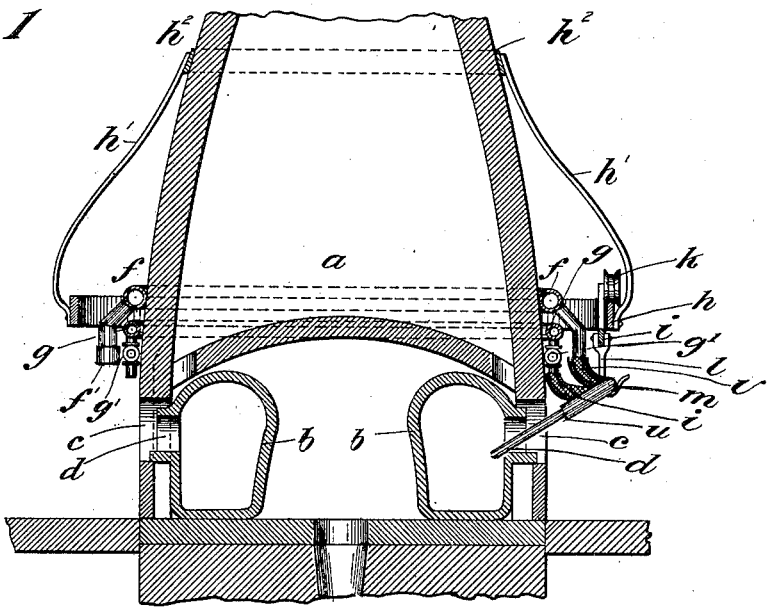
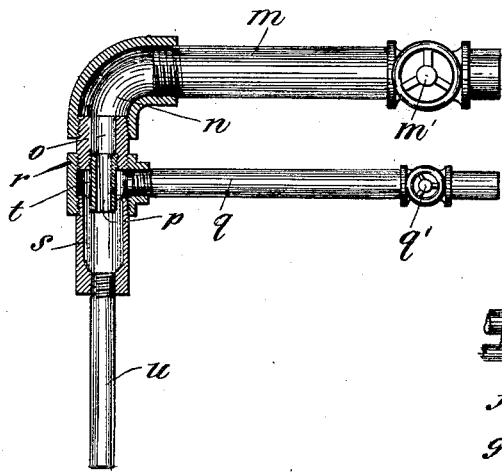
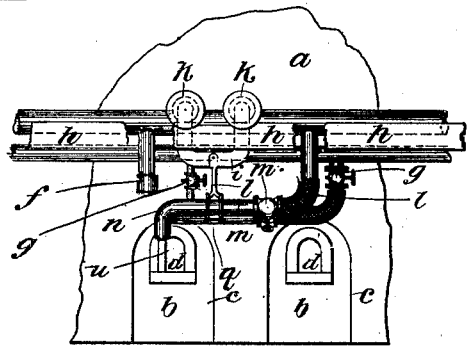
Witnesses
Walter Famariss
Allan W. Foose.
Inventors
Christian Z F Rott &
John H Croskey
By Kay & Totten
Attorneys
THE NORRIS PETERS CO., PHOTO-LITHO., WASHINGTON, D. C.

UNITED STATES PATENT OFFICE.

CHRISTIAN Z. F. ROTT AND JOHN H. CROSKEY, OF PITTSBURG, PENNSYLVANIA, ASSIGNORS TO SAID CHRISTIAN Z. F. ROTT.

APPARATUS FOR OVERCOMING CORDS IN GLASS.

SPECIFICATION forming part of Letters Patent No. 675,015, dated May 28, 1901.

Original application filed January 23, 1896, Serial No. 576,513. Divided and this application filed July 18, 1900. Serial No. 24,004. (No model.)

*To all whom it may concern:*

Be it known that we, CHRISTIAN Z. F. ROTT and JOHN H. CROSKEY, residents of Pittsburg, in the county of Allegheny and State of Pennsylvania, have invented a new and useful Improvement in Apparatus for Overcoming "Cords" in Glass; and we do hereby declare the following to be a full, clear, and exact description thereof.

Our invention relates to apparatus for preventing the cords in glass during the working of the pot.

This application is a division of our application filed January 23, 1896, Serial No. 576,513.

The melting-pots are arranged around within the furnace at suitable intervals and are heated solely by the surrounding heat of the furnace, said pots being entirely closed, with the exception of the opening through which the glass is gathered. As these pots are constructed of refractory material, with walls three, four, and five inches thick, any slight reduction of the temperature of the furnace will cause the glass in the pots to become stiff and difficult to gather. In such cases the gathering from the pot must cease, and the mouth of the pot is closed and remains so until the heat of the furnace has brought the glass back to the proper consistency. This often takes several hours.

The cause of the existence of "cordy" glass in the melting-pots has been a matter of much dispute among glass-manufacturers, and many theories have been advanced and remedies suggested; but the evil has not heretofore been abolished. The cords in the glass, however, we believe to be caused in the following manner: Each time a gatherer inserts his pontil into the furnace-opening which coincides with the opening in the pot to gather the glass, as he withdraws said pontil there is always a long cord or string of glass hanging from the body of molten glass on the pontil, which drops back into the pot. The time expended by the gatherer in turning and twisting the pontil at the opening of the furnace to permit any excess of the molten glass to drop back into the pot permits these cords to chill and harden. They thus drop back into the pot in this chilled state, and oftentimes the heat of the pot and the molten glass is not sufficient to reduce them to fluid form or the consistency of the molten glass within the pot. These cords congregate in the pot and are gathered up by the pontils with the molten glass, and when pressed or drawn these cords cause lines or streaks in the finished article of glassware. If the glass in a pot once becomes stiff or cordy, practically all of the ware made therefrom has to be rejected or sold at a reduced price as seconds. Gathering from that particular pot may have to cease and the glass be removed therefrom, so that it involves a great loss in time, labor, and damaged goods. We propose by our invention to prevent this stiff and cordy glass; and our invention consists, generally stated, in means for projecting heat down at an angle upon the glass in the pot at a point adjacent to the place of gathering.

In the accompanying drawings, Figure 1 illustrates a common form of glass-furnace in section, showing the arrangement of the pots therein and a suitable apparatus for introducing the heat. Fig. 2 is a front view of the apparatus. Fig. 3 is an enlarged detail view.

The furnace $a$ is a common form of pot-furnace, circular in form, with the pots $b$ arranged around in a circle therein. A detailed description of the furnace is unnecessary, further than that it has the openings $c$ arranged at intervals in its walls, said openings coinciding with the openings $d$ in the pots when said pots are arranged in order. The gathering is done through the coincident openings $c$ and $d$. The pots $b$ are closed, with the exception of the openings $d$.

As hereinbefore stated, our invention consists, essentially, in means for projecting heat down at an angle upon the glass in the pot from time to time to prevent cordy or stiff glass. Now this heat may be that generated by the combustion of gases, oils, or pulverulent carbon, or air itself may be introduced at a very high temperature. In the accompanying drawings we have illustrated our invention where gas is employed to create the heat. In the form of apparatus illustrated,

*f* represents the air-pipe, and *g* the gas-pipe, which encircle the furnace above the openings. Encircling the furnace is the track *h*, on which the wheels *k* of the trolley *i* run. The track is supported by the arms *h'*, depending from the ring $h^2$, which encircles the furnace above. This trolley *i* has the hook *l* connected thereto, which supports the injecting device. This device consists of the air-pipe *m*, having the valve *m'*, controlling the flow of air therein. An elbow *n* connects the air-pipe *m* to the threaded thimble *o*. A nipple *p* engages with the thimble *o*. A gas-pipe *q* leads into the coupling-sleeve *r*, said sleeve connecting the thimble *o* and coupling *s*. The nipple *p* extends beyond the point where the pipe *q* enters the coupling-sleeve *r*, and an annular space *t* is formed around said nipple. The pipe *q* is provided with the valve *q'*. A nozzle or injector *u* is connected to the coupling *s*, by which the intermingled gas and air is introduced into the pot. Flexible tubing or hose *v* connects the pipes *m* and *q* with the pipes *f* and *g*, respectively. The gas-pipe *g* is controlled by an ordinary automatic coupling-valve *g'*. The air-pipe *f* is closed by the automatic coupling-valve *f'*. By the above construction the device may be shifted from one pot to another all around the furnace and connected up in a very short time.

If the glass in any one of the pots has become cordy or too stiff to gather properly, the device hereinbefore described, suspended from the trolley *i*, is moved around to the pot to be operated on, when the nozzle *u* is inserted into an opening in the pot, said nozzle being inclined to throw the heat down upon the surface of the glass at a proper angle. The nozzle may be inserted at one side of the opening of the pot, so as not to interfere with the gathering of the glass; but the inner end of the nozzle is so directed that it will throw the heat down upon the glass at a point which is adjacent to the place from which the glass is gathered by the gatherer. The hose is then connected to the various pipes in the manner shown and the valves opened. The combined air and gas is thus projected onto the glass, creating an intense heat and acting to melt any cords in the glass. Practical experience has demonstrated that a pot containing glass too stiff to gather properly or so cordy as to render the ware made therefrom unfit for use can in a very short time be converted into a mass of the proper consistency and free from cords. The ware which before was streaked with lines is now free from imperfections. The apparatus is one which can be readily adjusted into position, and it is only necessary to use it when the glass becomes cordy. By directing the heat down upon the glass, so that it strikes the glass close to the point from which it is gathered, the result is that the glass is soon of the proper consistency and that the whole pot can be worked out.

As hereinbefore stated, we do not mean to limit ourselves in any manner to the form of furnace or the heating device illustrated or to the employment of gas as the heating agency.

What we claim as our invention, and desire to secure by Letters Patent, is—

1. The combination in a glass-furnace having melting-pots, of means for normally heating said pots, and additional means for projecting heat down upon the exposed surface of the molten glass in the pot at the point where the glass is being gathered, said means being movably supported in front of the furnace in such manner as to permit it to be brought in front of the various pots.

2. The combination in a glass-furnace, of closed pots therein, having an opening through which the molten glass is gathered, means for heating said pots externally, means projecting into the gathering-opening of the pots for projecting heat down upon the surface of the molten glass at the point where the glass is being gathered and means for supporting said heating means to be movable around the furnace whereby it may be brought before the proper pot.

3. The combination with a glass-furnace, of a track encircling the same, a trolley suspended from said track, a nozzle, and gas and air pipes connected to said nozzle supported by said trolley.

In testimony whereof we, the said CHRISTIAN Z. F. ROTT and JOHN H. CROSKEY, have hereunto set our hands.

CHRISTIAN Z. F. ROTT.
JOHN H. CROSKEY.

Witnesses:
ROBERT C. TOTTEN,
JAMES I. KAY.